United States Patent [19]
Larsson et al.

[11] Patent Number: 5,875,547
[45] Date of Patent: Mar. 2, 1999

[54] CABLE SEALING METHOD

[75] Inventors: Bjørn Larsson, Østfold; Liv Molvik Lundegaard, Fredrikstad, both of Norway

[73] Assignee: Alcatel, France

[21] Appl. No.: 933,722

[22] Filed: Sep. 19, 1997

[30] Foreign Application Priority Data

Nov. 28, 1996 [NO] Norway ................................. 965066

[51] Int. Cl.[6] .......................... H01R 43/00; H01R 43/04
[52] U.S. Cl. ................................ 29/869; 29/858; 29/862; 156/49; 427/435; 427/377; 427/120; 264/272.11; 174/84 C; 174/84 R
[58] Field of Search .............................. 29/855, 856, 858, 29/868, 869, 862; 174/84 R, 84 C, 73.1; 156/49; 427/435, 377, 295, 117, 120, 388.1; 264/271.1, 272.11, 129, 134, 135

[56] References Cited

U.S. PATENT DOCUMENTS

| | | |
|---|---|---|
| 5,234,515 | 8/1993 | Sekkelsten . |
| 5,422,438 | 6/1995 | Lamone ................................ 174/84 C |

FOREIGN PATENT DOCUMENTS

| | | |
|---|---|---|
| 0 341 621 | 3/1994 | European Pat. Off. . |
| 0 639 869 | 7/1996 | European Pat. Off. . |
| 2-65612 | 3/1990 | Japan ....................................... 156/49 |
| 2-129384 | 5/1990 | Japan ..................................... 427/377 |
| 842134 | 7/1960 | United Kingdom ................. 427/388.1 |

OTHER PUBLICATIONS

IEEE Insulated Conductors Committee of the IEEE Power Engineering Society—IEEE: Transactions on Power Apparatus and Systems, vol. PAS–103, No. 3, Mar. 1984, pp. 536–541.

"Telecommunication Cable Splicing Method Using a New Heat Shrinkable Sleeve", Yokoyama et al., Proceedings of the 29th International Wire & Cable Symposium, pp. 151–158, Nov. 1980.

Sleeve–Cable Joining with Heat–Shrinkable Tubing for Splice Enclosures, Yamakawa et al., Review of the Electrical Communication Laboratories, vol. 25, No. 5–6, May 1977.

*Primary Examiner*—Peter Vo
*Assistant Examiner*—Bobby Rushing, Jr.
*Attorney, Agent, or Firm*—Ware, Fressola, Van der Sluys & Adolphson LLP

[57] ABSTRACT

This invention relates to a method for preventing transport of fluids—such as water and/or gas—through a joint between at least two insulated cable conductors (1,2;21,22, 23). The method includes provision of a jointing ferrule (3) for insertion of the conductor ends into the ferrule and making required electrical contacts, —and provision of a molded sheath (8) of insulation material over the joint in sealed contact with the conductor insulation. The ferrule is precovered with a coating containing EEA copolymer to obtain improved adhesion between the ferrule and the insulation sheath. The mold material must be compatible with—and preferably of the same material—as the conductor insulation.

7 Claims, 1 Drawing Sheet

CABLE SEALING METHOD

BACKGROUND OF INVENTION

1. Technical Field

The present invention relates to a method for preventing longitudinal transport of fluids—such as water and/or gas through a joint between at least two insulated cable conductors,—including provision of a jointing ferrule for insertion of the conductor ends into the ferrule and making required electrical contacts,—and providing a molded sheath of insulation material over the joint in sealed contact with the conductor insulation.

The invention relates in particular to offshore and subsea cables and the technical problem is to prevent transport of gas and water along the conductors of offshore signal cables when there is a substantial pressure difference between the two ends of the cable. Such pressure difference may occur when one end of a subsea cable has to be lifted to the surface for installation or otherwise. When the sea depth is several hundred meters fluids within the subsea part of a cable will tend to be pressed along the cable core underneath the conductor insulation up to the surface end of the cable. The pressure difference may be more than 10 bars and appearance of such fluids at the top end of the cable is unacceptable.

2. Description of the Prior Art

In U.S. Pat. No. 5,234,515, there is described a method for connecting two electrical conductors. The interconnection between the two insulation sheathed conductors in subsea environments is done using a subsea connector including a metal conductor splice pin arrangement and a splice insulation sleeve. A metal tube is placed over the splice insulation sleeve. The conductor insulation sheaths are molded to respective opposite sides of the metal tube. This solution is too complicated for interconnecting two conductors covered with the insulation material such as PE, and the suggested pretreatment of the metal tube is not capable of preventing transport of pressurized gas/water from one side of the interconnection to the other.

EP 0 639 869 relates to a sealed corrosion-proof crimped terminal or splice aiming at substantially reducing occational cracking of the terminal during the crimping process. There is described use of a splice pin arrangement similar to that mentioned in the above mentioned US patent. The splice pin has an internal wall to provide a water-tight gas-proof barrier between the two conductors. The crimped terminal described may be encapsulated in a protective heat-shrinking tubing or the like,—but it is not likely that any such tubings will prevent penetration of fluids—such as water or gas—under pressure between the tubing and the splice pin from one side of the terminal to the other.

EP 0 341 621 relates to electrical power cables having ethylene polymer insulation with improved endurance against formation of water trees. In connection with this task there is mentioned use of well known components like ethylene-alkylacrylat copolymers and ethylene-alkylacrylat-acrylacid-terpolymer. The problem of formation of water trees in power cable insulation sheaths is, however, quite a different technical field than that of the present invention.

SUMMARY OF THE INVENTION

The object of the present invention is—as mentioned—to prevent transport of fluids at pressures up to 15 bars and more longitudinally under the insulation sheath of a cable conductor. With the invention there is obtained a strong joint with efficient water- and gas-blocking longitudinally. The main features of the invention are defined in the accompanying claims.

The basic idea is to provide an improved coating on the outer surface of the jointing ferrule before providing a molded sheath. The process includes the steps of immersing the ferrule in a special solution (after roughening its outer surface), crimping (well known process step) the bare conductor ends within the ferrule and finally covering the joint with a molded sheath sealed to the conductor insulation. The advantage of this method is that of solving the problems mentioned above This new gas and water blocking method is capable of withstanding an internal conductor pressure difference of minimum 15 bars because the adhesion between the polymer and copper is substantially increased.

Above mentioned and other features and objects of the present invention will clearly appear from the following detailed description of embodiments of the invention taken in conjunction with the drawing.

DETAILED DESCRIPTION OF THE INVENTION

Figure 1:
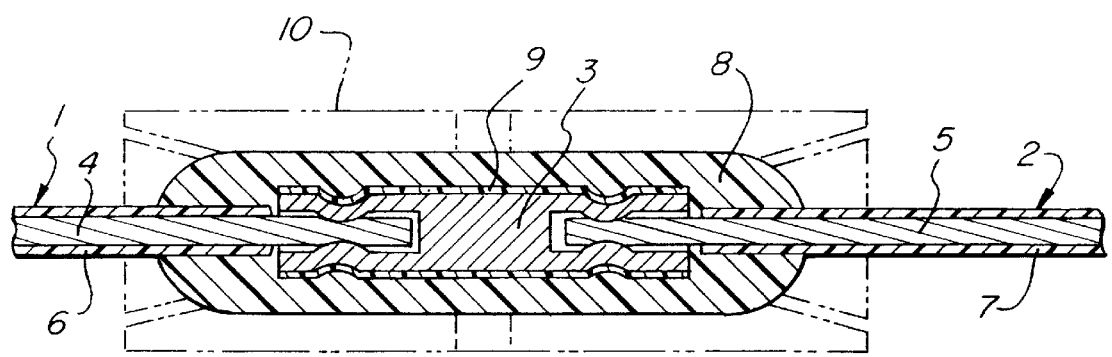
FIG. 1 illustrates a joint between two conductors.

In FIG. 1, two conductors 1 and 2 are joined in a copper ferrule 3 by a crimping process or otherwise. The conductors may have single-wire or multi-wire cores 4 and 5 and the insulation material 6 and 7 may be a polymer such as MDPE (medium density polyethylene). The copper ferrule 3 is provided with an internal wall which effectively prevents penetration of fluids from conductor core 1 to conductor core 2. Over the copper ferrule 3 and covering the ends of the insulation sheaths 6 and 7 there is a molded sheath 8 of polymer material such as MDPE. The molded sheath 8 should preferably be applied with injection molding. A molding jig 10 for this purpose is indicated with broken lines. The problem of preventing transport of fluids under pressure along the interface surfaces between the ferrule 3 and the molded sheath 8 has been solved by precoating the ferrule surface with a solution containing EEA copolymer (Ethylene-Ethyl-Acrylate). The precoat which is applied on the ferrule prior to the insertion and crimping of the conductor ends, is indicated with reference number 9. The illustrated joints are not drawn to scale.

Typical ferrules used for conductors in the range of 1.5 $mm^2$ to 10 $mm^2$ are from 5–7 mm in diameter and some 30 mm long with 10 mm recesses from each side.

The precoating and precovering procedures include mechanical and chemical cleaning of the outer ferrule surface in a separate process,—before making the conductor joint. This may include immersing the ferrule in a solution containing the EEA polymer and heating the solution to its boiling point.

The coating may also be obtained by heating the solution to some 90–95 degrees Celcius before immersing the ferrule. After the immersion process, the coated dry ferrule is heated to some 190° C. and then cooled to room temperature in a Nitrogen atmosphere. The ferrule is then ready for the jointing process.

The solution may—in addition to the EEA copolymer—include a Cu-deactivator and Xylene. The solution could comprise 10±1 parts of EEA Copolymer 0.03±0.01 parts of a Cu deactivator, and 90±1 parts of Xylene Good results have been obtained with a solution consisting of 10 grams of EEA Copolymer, 0.03 grams of a Cu deactivator and 100 ml Xylen.

Figure 2:
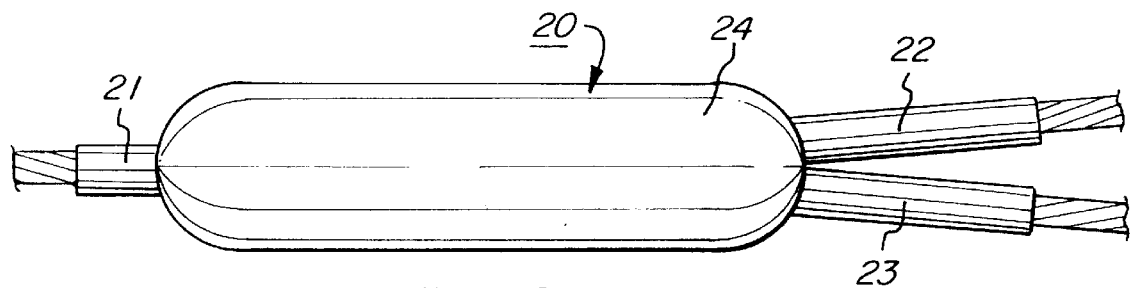
FIG. 2 illustrates a joint between three conductors.

In FIG. 2 is schematically illustrated a Y-joint 20 between one conductor 21 on the left hand side and two conductors 22 and 23 on the right hand side. The ferrule will have to be designed to accomodate a desired number of conductors and the crimping tool will have to be adapted to the type of ferrule used, but the pretreatment and precoating of the ferrule will have to be as described in connection with the embodiment of FIG. 1, and the molded sheath 24 will have to be adapted to the form of the joint.

The construction is solid and strong, and by using the same materials in the molded cover as in the cable itself we have avoided compatibility problems and weaknesses concerned with combination of different materials.

The above detailed description of embodiments of this invention must be taken as examples only and should not be considered as limitations on the scope of protection. Blocking joints may for example be required and installed on conductors separate from ordinary joints. The mold material must be compatible with—and preferably of the same material—as the conductor insulation. A PE molded sheath is used for sealing PE insulated conductors to the ferrule.

We claim:

1. Method of making a joint between at least two insulated cable conductors, comprising the steps of:

(a) providing a jointing ferrule;

(b) inserting ends of the insulated cable conductors into the jointing ferrule;

(c) making required electrical contacts between the jointing ferrule and the ends of the insulated cable conductors;

(d) precovering an outer surface on the jointing ferrule with a coating containing ethylene-ethyl-acrylate copolymer; and (e) providing a molded sheath of insulation material over the jointing ferrule in sealed contact with insulation on the insulated cable conductors, thereby preventing longitudinal transport of fluids through the joint.

2. The method according to claim 1, wherein the precovering step includes mechanical and chemical cleaning of the outer surface of the jointing ferrule as well as immersing the jointing ferrule in a solution containing the ethylene-ethyl-acrylate copolymer.

3. The method according to claim 2, wherein the solution containing the ethylene-ethyl-acrylate copolymer is heated to a range of about 90° to 95° C. before immersing the jointing ferrule.

4. The method according to claim 3, wherein after the immersing step, the coated jointing ferrule is heated to about 190° C. and cooled to room temperature in a nitrogen atmosphere.

5. The method according to claim 2, wherein during the precovering step, the coated jointing ferrule is heated to about 190° C. and cooled to room temperature in a nitrogen atmosphere.

6. The method according to claim 2, wherein the solution containing the ethylene-ethyl-acrylate copolymer also includes a copper deactivator and xylene.

7. The method according to claim 6, wherein the solution comprises 10±1 parts of ethylene-ethyl-acrylate copolymer, 0.03±0.01 parts of a copper deactivator, and 90±1 parts of xylene.

* * * * *